United States Patent [19]

Chaillout et al.

[11] Patent Number: 5,736,860
[45] Date of Patent: Apr. 7, 1998

[54] INDUCTIVE LOGGING SYSTEM HAVING MULTIPLE COILS FROM WHICH ARE SELECTED A RECEIVER AND A COUNTER-RECEIVER

[75] Inventors: Jean-Jacques Chaillout, Etienne De; Marcel Locatelli, Montbonnot; Patrice Giordano, Pertuis, all of France

[73] Assignee: Commissariat A L'Energie Atomique, Paris, France

[21] Appl. No.: 584,290

[22] Filed: Jan. 11, 1996

[30] Foreign Application Priority Data

Jan. 10, 1995 [FR] France ................................ 95-00198

[51] Int. Cl.⁶ .................................................. G01V 3/28
[52] U.S. Cl. .................................... 324/339; 321/341
[58] Field of Search .............................. 324/338, 332, 324/339, 333, 341, 334, 335, 323, 344; 364/422

[56] References Cited

U.S. PATENT DOCUMENTS

| | | | |
|---|---|---|---|
| 4,278,941 | 7/1981 | Freedman | 324/341 |
| 4,622,518 | 11/1986 | Cox et al. | 324/339 |
| 4,837,517 | 6/1989 | Barber | 324/339 |
| 5,065,099 | 11/1991 | Sinclair et al. | 324/339 |
| 5,157,605 | 10/1992 | Chandler et al. | 324/339 |

FOREIGN PATENT DOCUMENTS

| | | |
|---|---|---|
| 0 368 762 | 5/1990 | European Pat. Off. . |
| 2 121 189 | 12/1983 | United Kingdom . |
| WO 92/22834 | 12/1992 | WIPO . |

*Primary Examiner*—Sandra L. O'Shea
*Assistant Examiner*—Jay M. Patidar
*Attorney, Agent, or Firm*—Oblon, Spivak, McClelland, Maier & Neustadt, P.C.

[57] ABSTRACT

A well logging system using an induction measurement. The system includes an emitting coil and a plurality of receiving coils. The emitting coil induces eddy currents in the medium surrounding the coils. The receiving coils then measure magnetic fields produced by the eddy currents. Two of the receiving coils are selected at a time and used as a receiving coil and a counter-receiving coil. The signal generated in the two coils are used to determine a weighted difference to better define the vertical resolution of the device. Compensation coils may be added to remove fields which are induced in the receiving coils directly from the transmitting coil.

19 Claims, 3 Drawing Sheets

INDUCTIVE LOGGING SYSTEM HAVING MULTIPLE COILS FROM WHICH ARE SELECTED A RECEIVER AND A COUNTER-RECEIVER

FIELD OF THE INVENTION

The invention concerns a device able to embody profiles for investigating or logging a medium on the basis of measurements carried out by induction.

BACKGROUND OF THE INVENTION

This device may be used in a number of applications. It merely suffices for the device to be able to traverse a medium along an axis, such as for a drilling, the land surrounding the drilling well then being the medium to be characterized so as to determine the various geological beds and their aptitude to contain liquids, such as water or petrol. The invention is also applicable to the field of maritime exploration, the measuring medium then being the ocean in which it is desired to ascertain the characteristics of the various thermoclines.

The article by H. G. Doll and entitled << Introduction to induction logging and application to logging of wells drilled with oil base mud >> appeared in 'Petroleum Transaction', Jun. 1949, pp. 148–162 describes an investigation tool and the variables characterizing its performances. This tool is shown on FIG. 1 which also shows an emitting coil 2 traversed by a sinusoidal current, a receiving coil 4 and a counter-receiving coil 6 able to focus the measurement, that is limit along the axis z (tool axis) the zones measured. The measurement of the signal in phase with the transmitter allows for access to the environmental permeability via the effect of the terrain on the magnetic field produced by the transmitter. The signal in quadrature with the transmitter allows for characterization of the surrounding conductivity by the measurement of the magnetic field derived from eddy currents generated by the transmitter 2 in the medium to be measured. Of course, the simultaneous measurement of these two signals allows for access to all these variables.

This type of tool has two characteristic variables: the vertical resolution and the investigation depth. Known tools are unable to simultaneously measure several radial profiles with the characteristics required. In order to simultaneously measure several radial profiles, it is necessary to either carry out several passages of the tool in the medium or process the measurements so as to correct the characteristics of the tools. Furthermore, this characteristic variables do not take account of the contribution to the signal of the entire terrain and consider the detection zone as being rectangular, which, in practice, is erroneous. The zone actually measured is delimited by two arcs of a circle defined the laws relating to physics. Simplification consisting of regarding the detection zone as being rectangular thus leads to measurement errors as soon as the device is removed.

SUMMARY OF THE INVENTION

The invention concerns a device able to simultaneously determine at various regions (or investigation depths) the medium traversed by the device along an axis. With this device, conductivity measurements are obtained which have the same vertical resolution for various investigation depths with respect to the measurement axis.

More specifically, the invention concerns an induction measuring device comprising:

an emitting coil (E), n receiving coils, $B_k$, k=1, 2, ..., n with n≧3, digital means to select a pair ($B_i$, $B_j$) of receiving coils and to embody a weighted difference $r_i S_i - k_j S_j$ between the signals $S_i$, $S_j$ of the two coils of the selected pair.

With this device, it is possible to simultaneously determine the traversed medium at different investigation depths. Different investigation depths are obtained depending on the selected pair of receiving coils. The choice of pairs of coils is entirely free for an operator and requires that the number of tools is more than the number of coils required in the prior art. Furthermore, corresponding to each pair of coils is a vertical resolution specific to this pair of coils.

According to a particular embodiment, the ratio $k_j/r_i$ is selected so that, if $N_i$ (respectively $N_j$) is the number of turns of the coil $B_i$ (respectively $B_j$) and $z_i$ (respectively $z_j$) is the distance of the coil $B_i$ (respectively $B_j$) to the emitting coil E, the following equation is satisfactory:

$$N_j = (k_j/r_i) N_i (z_i/z_j)^2,$$

In this particular embodiment, a full focusing is obtained, that is when the vertical shape factor is nil between the coil $B_i$ and the coil $B_j$ (transmitter/counter-receiver pairing).

The coefficient $k_j$ can be selected as being equal to 1 or it may be proportional to the dimension of the counter-receiver (that is to the distance $B_j$–E) or it may be proportional to the square of the dimension of the counter-receiver.

The coefficient $r_i$ may be selected as equal to 1.

According to another particular embodiment of the invention, the distance between two successive coils is constant and equal to ΔB. In this case, if the selected pair of coils is a pair of adjacent coils, the vertical resolution $R_v$ obtained for this pair of coils is constant and equal to √2·ΔB, and the investigation depth difference between two consecutive pairs is also constant and equal to ΔP=2ΔB.

So as to resolve the problem of the magnetic field directly transmitted by the transmitter in the receivers, a device conforming to the invention further includes means to be freed of the field directly emitted by the transmitter.

These means may consist of a compensation coil $B_{ci}$ mounted in series with each coil $B_i$.

According to one particular mode of this variant, the number of turns $N_{ci}$ of the compensation coil $B_{ci}$ is selected according to the equation: $N_{ci} = N_i (z_{ci}/z_i)^3$ where $z_{ci}$ represents the distance between the compensation coil $B_{ci}$ and the emitting coil E.

It is possible to place the compensation coils between the transmitter E and the first receiver $B_j$. This makes it possible to reduce the number of turns of the counter-receiving coils and thus their size and minimize their influence on the shape factors.

The invention also concerns a method for measuring by means of induction the characteristics of a medium and comprising the following stages:

induction of eddy currents in said medium with the aid of a transmitting coil, receiving of signals in n receiving coils, $B_k$, k=1, 2, ... n, with n≧3 in response to the induced eddy currents, selection of a pair $B_i$, $B_j$ of coils from the n receiving coils, formation of a weighted difference $r_i S_i - k_j S_j$ between the signals $S_i$, $S_j$ of the two coils of the selected pair.

According to particular embodiment of this method, the ratio $k_j/r_i$ is selected so that, if $N_i$ (respectively $N_j$) is the number of turns of the coil $B_i$ (respectively $B_j$) and $z_i$ (respectively $z_j$) is the distance from the coil $B_i$ (respectively $B_j$) to the emitting coil E, the following equation is then satisfactory:

$$N_j=(k_j/r_i)N(z_i/z_j)^2.$$

$k_j$ may be selected as equal to 1 for any value of j and may also be proportional to $z_j$ or $z_j^2$ (where $z_j$ is the dimension of the counter-receiver $B_j$).

It is also possible to select $r_i=1$.

In the case where the distance between two successive coils is constant, it is possible to select a pair of successive coils. In this case, an investigation depth and vertical resolution are obtained which are almost constant and proportional to the distance between two successive coils.

According to one variant of this method, the signals are filtered which makes it possible to define a sensitive rectangular zone with a height equal to the vertical resolution of the selected pair of coils and with a length equal to twice the investigation depth of the selected pair of coils.

BRIEF DESCRIPTION OF THE DRAWINGS

The characteristics and advantages of the invention shall appear more readily from a reading of the following description. This description relates to the embodiment examples, given by way of explanation and being non-restrictive with reference to the accompanying drawings on which.

DETAILED DESCRIPTION OF THE PREFERRED EMBODIMENTS

Figure 2:
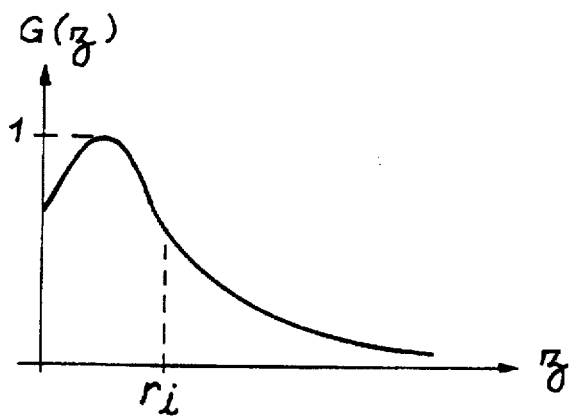
FIGS. 2A and 2B represent the aspect of the vertical and radial characteristics.
Figure 2:
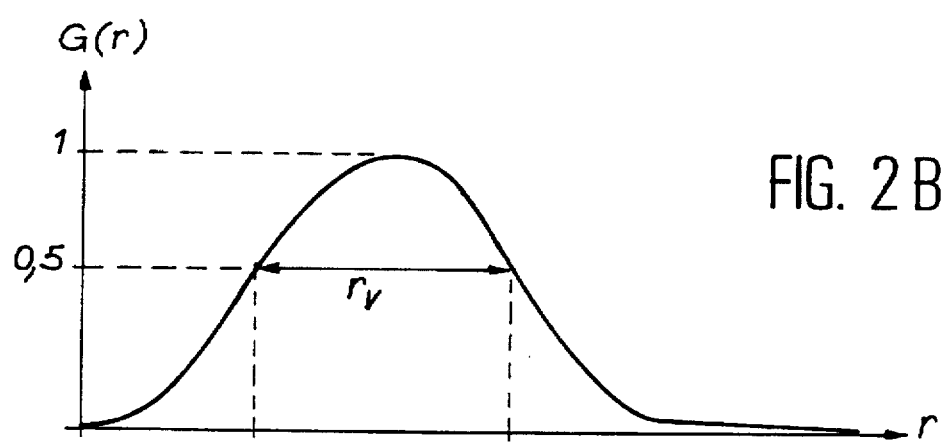
Figure 1:
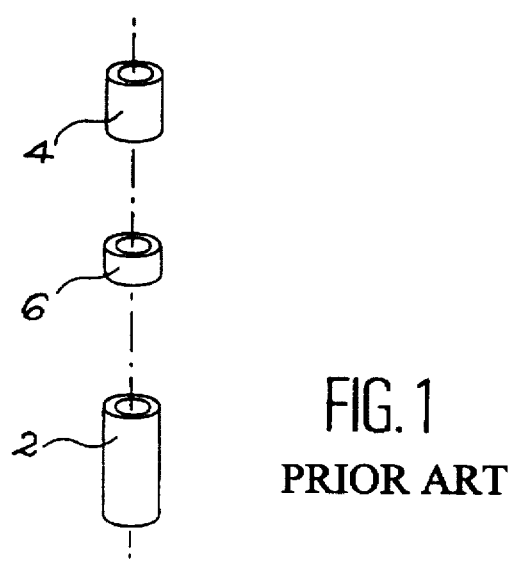
FIG. 1, already described, diagrammatically represents known measuring tool according to the prior art.

The notions of vertical resolution and investigation depth shall first of all be considered with reference to FIGS. 2A and 2B. Generally speaking, if a transmitting coil induces eddy currents in a medium to be measured where said currents then in turn produce an induction in a receiving coil R and if the signal measured is called e (voltage induced at the terminals of the receiver), this results in having the following relation:

$$e=k\iiint_{volume\ of\ the\ terrain} \sigma(x,y,z)S(x,y,z)dxdydz$$

where:

k is a constant, $k=N_R\omega^2$, ($N_R$ being the number of turns and $\omega=2\pi f$, f being the frequency of the induced current), $\sigma(x,y,z)$ is the electric conductivity of the terrain at the point (x,y,z), S (x,y,z) is the sensitivity at the point (x,y,z). The greater S is, the greater is the signal coming from the point (x,y,z) of the formation.

At the cylindrical coordinates r, θ, z, the axis z is parallel to that of the drilling. By assuming a terrain distribution independent of the angle θ, the radial characteristic is defined:

$$G_r(r)=\int_{-\infty}^{+\infty}S(r,z)dz$$

In this characteristic, it is possible to deduce the 'investigation depth' which is the depth $r_i$ for which the area under the curve $G_r$ (r) reaches 50% of the total value of the area (see FIG. 2A).

Thus, the vertical characteristic $G_v$ is defined:

$$G_v(z)=\int_{-\infty}^{+\infty}S(z,r)dr$$

The 'vertical resolution' $r_v$ can be deduced from this curve which is the width at mid-height of the curve (see FIG. 2B).

A device conforming to the present invention is now to be described with reference to FIG. 3. On this figure, the reference 10 denotes a transmitter able to generate a time-variable magnetic field at any point of the space to be studied, such as a field having a sinusoidal variation. The position of this emitting coil is taken as being originally on an axis z merged with the axis of the coil. This device further includes a succession of coils $B_i$ (there are five on these on FIG. 3), each having a number of turns $N_i$. These coils are able to measure the magnetic field produced by the eddy currents generated by the field of the transmitter 10 in the conductive land studied. They are connected to signal amplification means.

Figure 3:
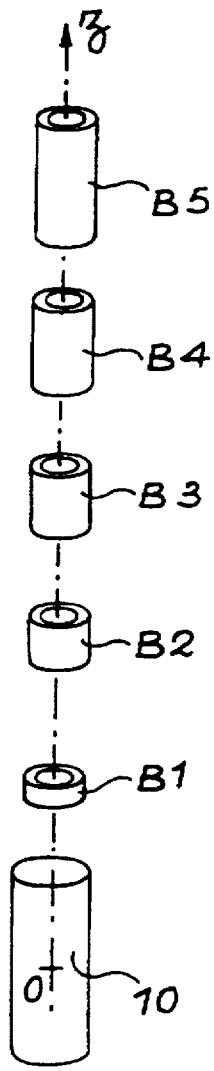
FIG. 3 is an example of the measuring tool of the present invention.

The device further includes digital means (comprising a microcomputer suitably programmed to this effect), not shown on FIG. 3, which are generally placed on the surface and connected to the transmitting coil/receiving coils structure and which are able to select a pair of receiving coils $B_i$, $B_j$ and embody the weighted difference between the signals $S_i$, $S_j$ of these two coils. This weighted difference shall be noted: $D_{ij}=r_iS_i-k_jS_j$.

These digital means may also include means to treat (such as by filtering), analyze and/or store the signals received from the receiving coils.

The device may further include means to move all the transmitters and receivers. The latter are, for example, mounted on a common support, as described, for example, in the document U.S. Pat. No. 5,157,605, said common support able to move the coils from one location to another, this movement being controlled from the surface, for example with the aid of the distal means already mentioned.

The simplest expression of $D_{ij}$ subsequently taken is the one for which the coefficient $r_i=1$. It is clear that the invention is not limited to this example and also includes any value of $r_i$.

The counter-receiver is defined as being the receiver $B_j$ whose signal $S_j$ is subtracted from the signal $S_i$ of the receiver $B_i$. The rôle of the counter-receiver is to focus the measurement.

The fact of digitally embodying the difference between the signals of the receiver and the counter-receiver on the surface makes it possible to freely select the receivers/counter-receivers pairings and in particular results in having a number of tools (receiver/counter-receiver pairings) greater than that of the known coils of the prior art.

In addition, a study of the shape factors showed that the characteristics of a tool (vertical resolution $R_{vi}$, investigation depths $P_i$) may be approached by the following formulae:

$$R_v=\sqrt{2}\ (z_i-z_j)$$

$$P_i=z_i+z_j$$

where $z_i$ and $z_j$ are respectively the distance from the receiver $B_i$ and counter-receiver $B_j$ to the transmitter 10. These formulae are sufficiently accurate in the general case of real transmitters and receivers so as to establish a model of induction tools. Thus, a vertical resolution $R_{vi}$ and an investigation depth $P_i$ are obtained, which is characteristic of each receiver/counter-receiver pairing. finally, in the light of the measurements to be carried out, it is the operator who selects the receiver/counter-receiver pairing best adapted to the medium to be examined and which accordingly defines the investigation depth and the vertical resolution of the selected tool. This device makes it possible to ensure high flexibility when selecting receivers and counter-receivers.

Earlier, it was said that the counter-receiver is able to focus the measurement. In fact, this focusing is perfect when the vertical shape factor is nil between the transmitter and the counter-receiver, which corresponds to the case where the number of turns of two receivers $B_i$ and $B_j$ satisfy to following equation:

$$N_j = k_j N_i (z_i/z_j)^2.$$

According to this formula, it is the product of the coefficient $k_j$ by the number of turns $N_j$ of the counter-receiver which shall verify a stress. The choice of the coefficient $k_j$ is effected according to criteria independent of the geometrical characteristics of the tool. This may for example, be the spatial requirement of the coils, the level of the signal, the signal/noise ratio or the stresses imposed by the field of study (size of the drilling well). For example, it is possible to select all the coefficients $k_j$ equal to 1. The signal provided by a measuring tool is then independent of the transmitter/receiver distance, but the size of the coils increases with the square of the distance to the transmitter.

If the coefficients $k_j$ are proportional to the dimension of the counter-receiver, it is the signal of each coil which is constant and the size of the coils merely increases more linearly with the distance to the transmitter.

If the coefficients $k_j$ are proportional to the square of the dimension of the counter-receiver, the signal of each coil decreases with the distance, but their size is constant. Any other value of the coefficients $k_j$ results in different amplitude signal variations, but does not affect the geometrical performances of the selected measuring tool and in particular the choice of each coefficient $k_j$ may be different from one receiver/counter-receiver pairing to another receiver/counter-receiver pairing.

According to one particular case, it is possible to select for a receiver/counter-receiver pairing two successive coils $B_{i-1}$ and $B_i$. In this case, if the distance between two successive coils is constant (equal to $\Delta B$), the expression of the characteristics $R_{vi}$ and $P_i$ is simple: $R_{vi} = \sqrt{2}$. $\Delta B$ and $P_i = 2\Delta B + P_{i-1}$.

Thus, a tool conforming to the one described with reference to FIG. 3 has been embodied (5 receiving coils) with $\Delta B$ equal to almost 21.5 cm. This results in having 5 basic tools (a basic tool is called a receiver/counter-receiver pairing for which the counter-receiver is immediately close to the receiver) with a vertical resolution of about 33 cm and investigation depth varying by steps of 43 cm from 23.5 cm.

The power of such a structure resides in the possibility of defining several other tools according to the row of the counter-receiver with respect to the receiver, that is according to the distance between the counter-receiver and the receiver. Thus, if the counter-receiver and the receiver are not immediately adjacent but are separated by a coil, it is possible to define, for example in the case of FIG. 3, four tools with vertical resolution of about 66 cm and investigation depth varying according to the same step $\Delta P$ as previously from 45.1 cm. It is also possible to select a receiver and counter-receiver separated by two intermediate coils, which corresponds to 3 possible tools for the particular case shown on FIG. 3 with a vertical resolution of 99 cm and an investigation depth varying linearly according to the step $\Delta P$ from 66.7 cm.

Figure 5:
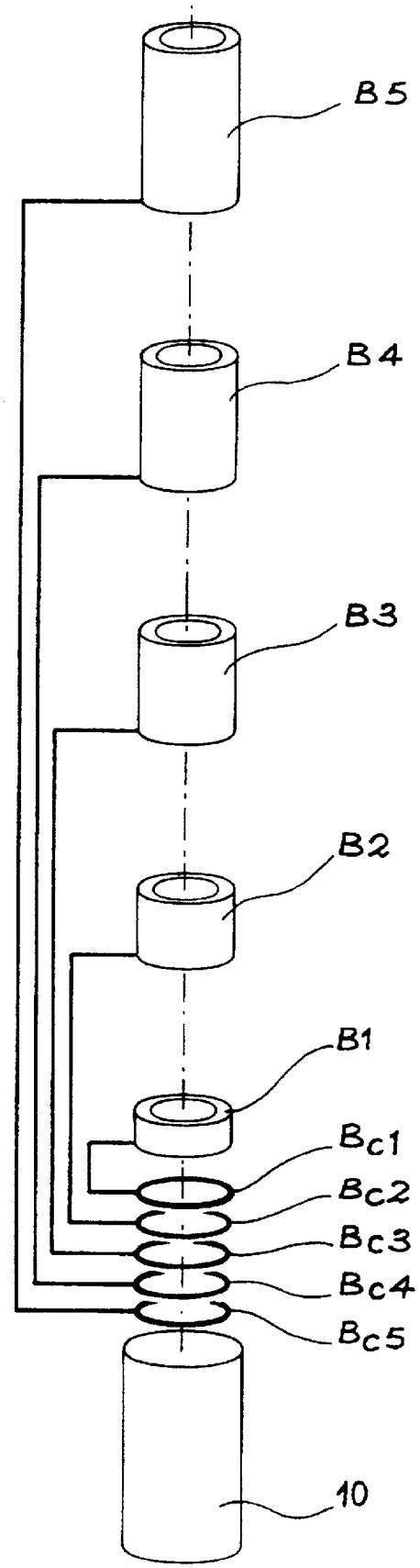
FIG. 5 is a measuring tool with compensation coils

So as to best as possible measure the magnetic field derived from eddy currents, it may sometimes be necessary to be freed of the field directly emitted by the transmitter 10 in the coils $B_i$. This is effected by placing in series on each tool a compensation coil. So as to retain full flexibility in determining the tools, it is possible to embody a compensation coil for each coil, and the measurements transmitted to the surface from each coil are thus intrinsically accurate. This arrangement is seen in FIG. 5 where compensation coils $B_{c1}$–$B_{c5}$ are associated with the receiving coils. If the compensation coil associated with the coil $B_i$ is called $B_{ci}$, the number of coils $N_{ci}$ of this compensation coil for an optimal compensation depends on its position with respect to the coil $B_i$. This dependence is given by the equation:

$$N_{ci} = N_i (z_{ci}/z_i)^3.$$

All the positions of the compensation coil $B_{ci}$ with respect to the coil $B_i$ are permissible. It is possible to place all the coils $B_{ci}$ between the transmitter E and the first receiver $B_1$ so as to reduce the number of turns and thus the size of the compensation coils and accordingly minimize their influence on the shape factors.

Figure 4:
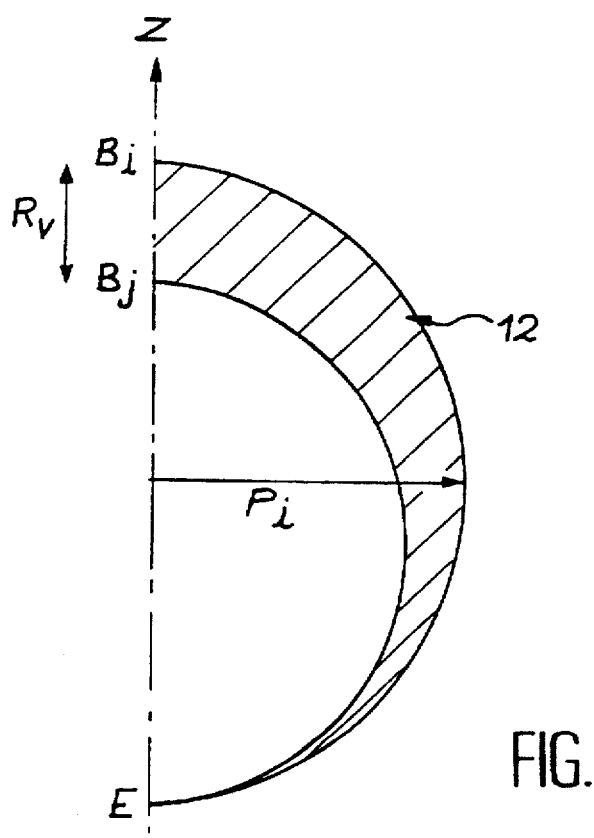
FIG. 4 is a diagram of the zones corresponding to the vertical resolution and investigation depth of a tool conforming to the invention.

The above condition has been given so that the vertical shape factor is nil between a transmitter and a counter-receiver. In fact, this does still not correspond to the case where the zone providing the signal is rectangular (with height equal to the vertical resolution and length equal to twice the investigation depth). As shown on FIG. 4, this zone has rather the shape of a crescent 12. The region leading to the vertical resolution corresponds to the point situated between the receiver $B_i$ and the counter-receiver $B_j$, whereas the zones representative of the investigation depth are rather situated at midway between the transmitter $B_i$ and the counter-receiver $B_j$. This means that the geometrical characteristics ($R_{vi}$ and $P_i$) of the selected tools are not completely representative of bi-dimensional aspects. In this case, it is not possible to say that the induction tool is able to measure a section with a height equal to the vertical resolution.

So as to actually obtain a rectangular zone having good geometrical characteristics, it is then possible to process the signals measured along the well, for example by a filtering treatment. This filtering method has been described in the U.S. Pat. No. 5,157,605 where this method basically consists convolution operations. Thus, if $m_i$ is the measurement after treatment, $s_j$ the measurement prior to treatment, N the number of selected tools, and $a_{ij}$ filtering of the signal $j$ for the measurement $i$, the following can be written:

$$m_i(z) = \sum_{j=1}^{N} a_{ij}(z) * S_j(z)$$

This operation introduces a convolution which renders the calculation of filters difficult as measurements at different dimensions act at the same point. It is possible to look for a mathematical transformation permitting an easy calculation of the filters by suppressing the convolution. For example, it is possible to resort to an Fourier transformation, the preceding expression becoming:

$$M_i(v) = \sum_{j=1}^{N} A_{ij}(v) S_j(v)$$

$M_i$, $S_j$ and $A_{ij}$ are Fourier transformations of $m_i$, $s_j$ and $a_{ij}$ and $v$ is the spatial frequency (or dual variable of the dimension z). In this expression, the determination of filters at a spatial frequency is independent of the other frequencies. The method is thus extremely powerful since it is then possible to select the restored frequency range and the desired precision by choosing a suitable apodization.

The determination of the filters is reduced to resolution of a linear system. It is possible to force this system to a square shape which leads to selecting a highly restricted number of rays whose response is forced. However, outside of these rays, the signal is controlled extremely poorly. So as to obtain a high-performing tool, it is necessary to increase the number of forced rays, the linear system then being rectangular. Its resolution may be effected iteratively and approached by the least errors square method, as in the U.S. Pat. No. 5,157,605.

It is also possible to propose using a method known as the pseudo-inverse method fully adapted to these problems and which directly leads to optimum. Thus, if the preceding linear system is taken down in a matrix form:

$$|M|=|S|.|A|$$

where M is the matrix of the stresses, S the rectangular matrix of the measurements and A that of the unknown filters. The pseudo-inverse $S^+$ is written:

$$|S|^+=(|S|^T.|S|)^{-1}|S|^T$$

where $S^T$ is the transposed value of S. As it is easy to calculate the pseudo-inverse, the determination of the filters is obtained simply and with maximum precision by the matrix product:

$$|A|=|S|^+|M|$$

The filtering of the measurements can be deferred in the Fourier domain, but is also possible and often preferably to carry it out in real time by using the spatial representation of the filters by deconvolution, the filters in the spatial domain being obtained by reciprocal transform. Thus, the operators has access in real time to the characteristics of the terrain. For each selected filtering operation, it merely suffices to program the digital means (microcomputers) already mentioned in a way corresponding to said filtering operation.

What is claimed is:

1. Induction measuring device comprising:
   an emitting coil for inducing eddy-currents in a medium to be measured,
   n receiving coils, $B_k$, k=1 ... n, with n≧3, for measuring magnetic field produced by said eddy-currents,
   digital means, connected to said receiving coils, for selecting a pair of coils $B_i$, $B_j$ from said n receiving coils where 1≦i≦n and 1≦j≦n, each coil of said pair of receiving coils producing a signal $S_i$, $S_j$ said digital means also calculating a weighted difference $r_iS_i-K_jS_j$ between said signals $S_i$, $S_j$ of said two coils, whereby $r_i$ and $K_j$ are weighing coefficients, the investigation depth and the vertical resolution of the device being defined by the pair $B_i$, $B_j$ of selected receiving coils.

2. A device according to claim 1, said weighing coefficients $K_j$ and $r_i$ being such that, if $N_i$ (respectively $N_j$) is the number of turns of selected coils $B_i$ (respectively $B_j$) and $z_i$ (respectively $z_j$) is the distance of the coil $B_i$ (respectively $B_j$) to the emitting coil E, the following equation is satisfactory:

$$N_j=(K_j/r_i)N_i(z_i/z_j)^2.$$

3. A device according to claim 1 or 2, said weighing coefficient $K_j$ being equal to 1 for any value of j.

4. Device according to claim 1 or 2, $r_i$ being equal to 1.

5. Device according to claim 1 or 2, the distance between two coils being constant.

6. Device according to claim 1 or 2 further comprising means for eliminating from said receiving coils said signals $S_i$, $S_j$ of the field directly emitted by said emitting coil.

7. Device according to claim 6, said means for eliminating said signals $S_i$, $S_j$ comprising a compensation coil $B_{ci}$ being mounted in series with each of said coils $B_i$.

8. Device according claim 7, the following equation being verified: $N_{ci}=N_i(z_{ci}/z_i)^3$ where $N_{ci}$ is the number of turns of said compensation coil $B_{ci}$ and $z_{ci}$ and $z_i$ respectively represent the distances between said compensation coil $B_{ci}$ and said emitting coil and between said receiving coil $B_i$ and said emitting coil.

9. Device according to claim 7 or 8, said compensation coils $B_{ci}$ being disposed between said emitting coil E and the first receiving coil $B_i$ nearest E.

10. A device according to claim 1 or 2, said weighing coefficient $K_j$ being proportional to the distance between said coil $B_j$ and said emitting coil.

11. A device according to claim 1 or 2, said weighing coefficient $K_j$ being proportional to the square of the distance between said coil $B_j$ and said emitting coil.

12. Method for induction measuring the characteristics of a medium, comprising the following steps:
   induction of eddy currents in said medium with the aid of an emitting coil,
   receiving of signals in n receiving coils, $B_k$, k=1, 2 ... n, with n≧3, in response to said induced eddy currents,
   digitally selecting by digital means connected to said receiving coils, a pair $B_i$, $B_j$ of receiving coils from said n receiving coils where 1≦i≦n and 1≦j≦n,
   calculating a difference $r_iS_i-K_jS_j$ where $S_i$ (respectively $S_j$) is the signal measured at the terminals of said coil $B_i$ (respectively $B_j$) and where $r_i$ and $K_j$ are weighing coefficients, the investigation depth and the vertical resolution of the device being defined by said pair $B_i$, $B_j$ of selected receiving coils.

13. Method according to claim 12, said weighing coefficients $K_j$ and $r_i$ being such that, if $N_i$ (respectively $N_j$) is the number of turns of the coil $B_i$ (respectively $B_j$) and $z_i$ (respectively $z_j$) is the distance from the coil $B_i$ (respectively $B_j$) to the emitting coil E, the following equation is then satisfactory:

$$N_j=(K_j/r_i)N_i(z_i/z_j)^2.$$

14. Method according to claim 12 or 13, said weighing coefficient $K_j$ being equal to 1 for any value of j.

15. Method according to claim 12 or 13, $r_i$ being equal to 1.

16. Method according to claim 12 or 13, the distance between two consecutive coils being constant and the selected pair of coils being a pair of consecutive coils ($B_i$, $B_{i+1}$).

17. Method according to claim 12 or 13 further comprising the step of filtering the measured signals in order to define a sensitive zone providing the signal, which is rectangular-shaped and has a height equal to the vertical resolution of the selected pair of coils and a length equal to twice the investigation depth of the selected pair of coils.

18. Method according to claim 12 or 13, said weighing coefficient $K_j$ being proportional to the distance between said coil $B_j$ and said emitting coil.

19. Method according to claim 12 or 13, said weighing coefficient $K_j$ being proportional to the square of the distance between said coil $B_j$ and said emitting coil.

* * * * *